May 5, 1970    E. WEICHEL    3,509,925
APPARATUS FOR GRADUALLY BREAKING UP A HEAP
OF CEREAL OR LEAF CROP
Original Filed May 2, 1967    9 Sheets-Sheet 1

INVENTOR
ERNST WEICHEL

BY
ATTORNEYS

May 5, 1970     E. WEICHEL     3,509,925
APPARATUS FOR GRADUALLY BREAKING UP A HEAP
OF CEREAL OR LEAF CROP
Original Filed May 2, 1967     9 Sheets-Sheet 5

INVENTOR
ERNST WEICHEL

BY *Dicke & Craig*
ATTORNEYS

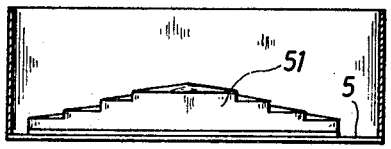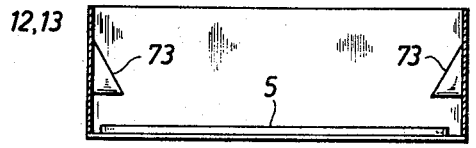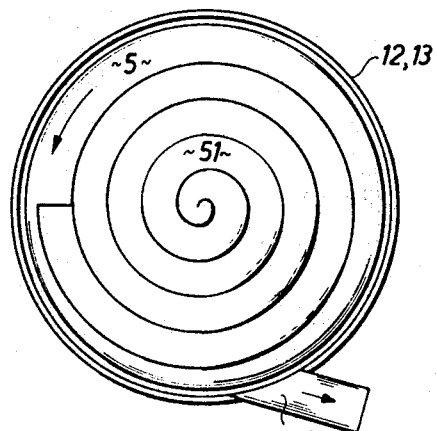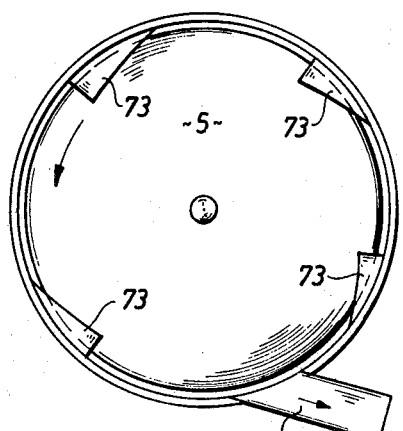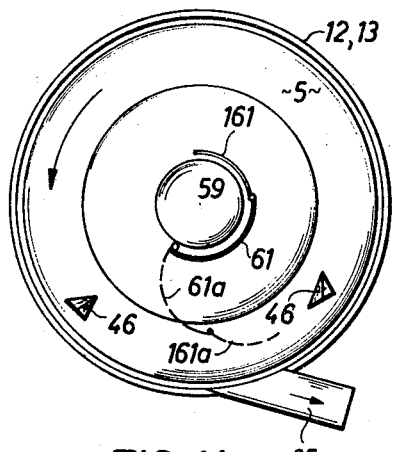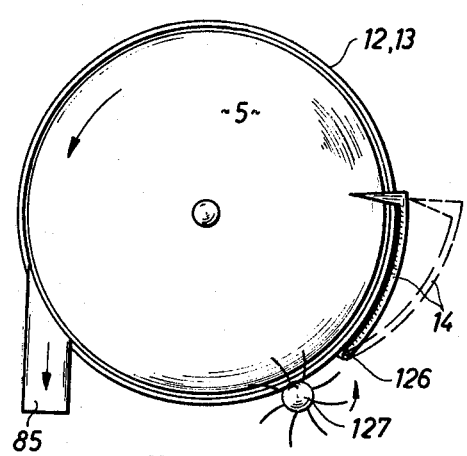

May 5, 1970 E. WEICHEL 3,509,925
APPARATUS FOR GRADUALLY BREAKING UP A HEAP
OF CEREAL OR LEAF CROP
Original Filed May 2, 1967 9 Sheets-Sheet 9

INVENTOR
ERNST WEICHEL

BY
ATTORNEYS

United States Patent Office 3,509,925
Patented May 5, 1970

3,509,925
APPARATUS FOR GRADUALLY BREAKING UP A HEAP OF CEREAL OR LEAF CROP
Ernst Weichel, Bahnhafstrasse 1, Heiningen, uber Goppingen, Germany
Continuation of application Ser. No. 635,481, May 2, 1967. This application Apr. 9, 1969, Ser. No. 830,169
Claims priority, application Germany, May 7, 1966, W 41,516
Int. Cl. A01d 55/00; B23d 19/00; B02c 11/04
U.S. Cl. 146—105                    31 Claims

ABSTRACT OF THE DISCLOSURE

There is disclosed apparatus for breaking up a heap or mass of cereal or leaf crop, in which cutting means adjacent a window in a stationary container wall cuts a sliver from a heap or mass rotated on a turntable forming the base of the container and in which various means are provided for urging the heap or mass outwardly into the range of the cutting means.

This is a continuation of application Ser. No. 635,481, filed May 2, 1967, and now abandoned.

Background of the invention

The invention relates to apparatus for gradually breaking up a mass of produce such as cereal or leaf crop, in which a turntable suitable for supporting a mass of produce forms the base of a stationary, axially symmetrical storage container having a window for the lateral egress of a sliver pared outwardly from the heap by a cutting means, the window corresponding to the cross section of the sliver.

The object of the invention is to improve the uniform egress of the pared sliver, particularly in the case of obstinate and unevenly stacked heaps of cereal and leaf crop. The invention proceeds from the knowledge that the uniform discharge is to a great extent dependent upon the uniform feed to the sawing or cutting device.

Summary of the invention

In accordance with the invention, this uniform feed is obtained substantially in that the stationary part of the apparatus is provided with means for directly engaging the rotating mass and directing it outwardly into the region of the cutting means, arranged in the vicinity of the outer wall of the container.

A particularly advantageous solution is obtained if the container has a central column on whose outer surface is arranged an outwardly directed guide device located above the turntable.

The guide device preferably comprises an adjustable feed flap pivotable preferably about a vertical axis and when in its inoperative position lying closely against the central column.

The central column may be constructed as a hollow cylinder passing through a central opening in the turntable and having fitted therein means for driving the feed flap.

Brief description of the drawings

The invention will be further described by way of example with reference to the accompanying drawings which illustrate several embodiments of the invention, and in which:

FIG. 14 is a schematic plan view of another embodiment, FIG. 15 is a schematic plan view of another embodiment, FIG. 16 is a schematic partial section of the embodiment of FIG. 15, FIG. 17 is a schematic partial section of another embodiment, FIG. 18 is a schematic plan view of the embodiment of FIG. 17, FIG. 19 is a schematic plan view of another embodiment.

Description of the preferred embodiments

Figure 1:
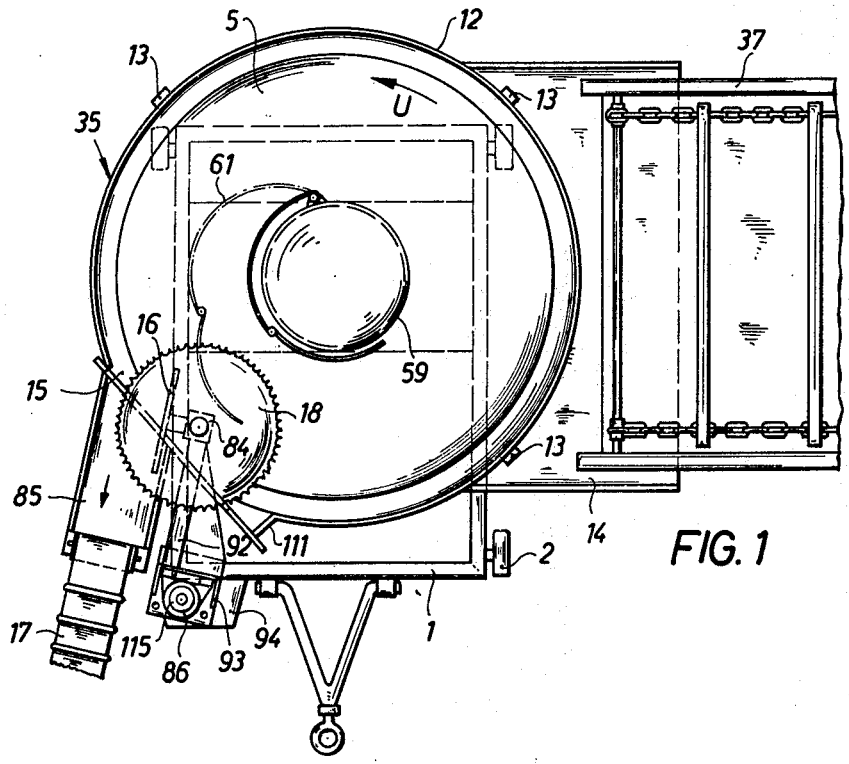
FIG. 1 is a plan view of one embodiment and showing a loading wagon in an unloading position.

Referring initially to FIGS. 1 to 6, a rotating track 60 is arranged on a base frame 1, which is movable on wheels 2. The track 60 comprises a lower ring 60a secured to the base frame 1 and an upper ring 60c running therein on ball bearings 60b. The upper ring 60c is outwardly and rigidly connected to a turntable 5 and a drive gear wheel 101 on a shaft 102 meshes with inwardly extending teeth on the upper ring 60c. The shaft 102 is mounted in bearing blocks 103, 104 of a column 59.

A sprocket wheel 105 secured to the shaft 102 is connected to a second sprocket wheel 107 by a chain 106. The sprocket wheel 107 is located at the lower end of a geared motor 108 secured to the inner side of the column 59. When the motor 108 is energized, it drives the drive gear wheel 101 via the chain drive 105, 106, 107, and the turntable 5 via the upper ring 60c.

Figure 2:
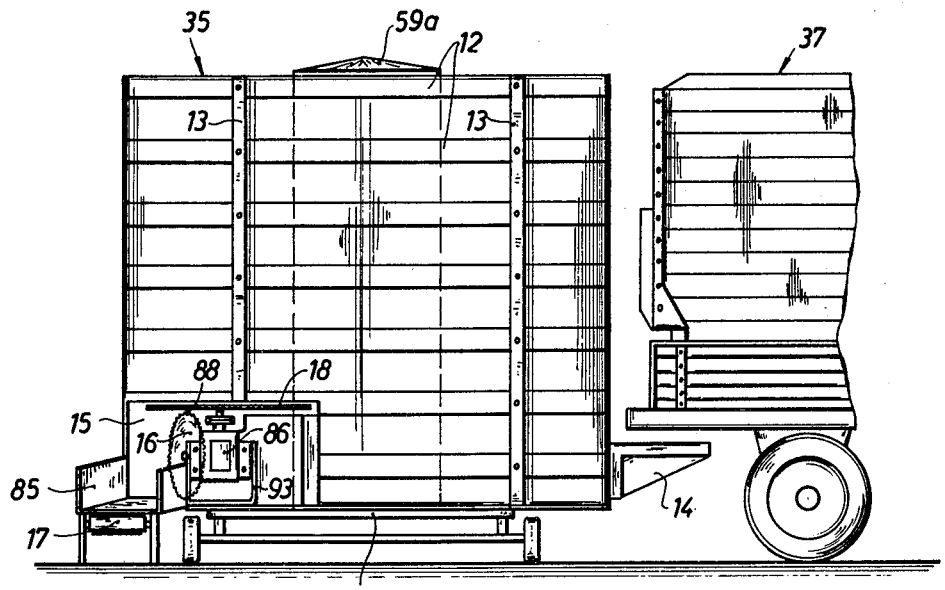
FIG. 2 is the end view of the embodiment of FIG. 1.

The column 59 in which the said drive elements are accommodated is rigidly secured to the base frame 1 via a flat ring 109 and a cylindrical part 110 of smaller diameter about which the turntable 5 rotates with slight clearance. The turntable 5 is outwardly surrounded with slight clearance by a stationary wall of a cylindrical container open at the top which, in this embodiment, comprises horizontally bent slats, pipes, or strips 12 of sheet metal, and vertical struts 13 (FIGS. 1 and 2).

The struts 13 are arranged on the outside of the sheet metal strips 12, so that vertical projections on the inside of the container wall 12, 13 are avoided. The turntable 5 forms the rotating base of the container whose inner column 59 and outer wall 12, 13 are rigidly connected to the base frame 1, so that they do not rotate. The turntable 5 and the axially symmetrical container wall 12, 13 together form a storage container 35.

The column 59 containing the drive elements is advantageously provided with a removable lid 59a of preferably conical construction. The top of the container 35 may also be covered by a roof. A part of the container wall 12, 13 may be lower in the region of a horizontally disposed feed table 14 which may be charged from a loading wagon 37, or by any other means.

A window 15 whose aperture is substantially rectangular is cut from a plate 112 flanged to a projection 111 on the side of the container wall 12, 13 remote from the feed table 14.

A mounting plate 94 located on the base frame 1 carries a support 93 of U-shaped cross section inclined somewhat obliquely to the storage container 35. An electric motor 86 is secured to the inside of the bridge of the U, and a bracket 92 carrying an angular drive 84 is secured to the outside.

A pulley 115 (FIGS. 4 and 5) on the shaft of the electric motor 86 above the support 93 drives a substantially vertical shaft 89 of the angular drive 84 via driving belts or driving chains 87 and a drive pulley 116 of the angular drive 84. The shaft 89 carries a circular saw blade 18 above the driving belts 87. The free end of a horizontal shaft of the angular drive 84 carries a circular saw blade 16 rotating in a vertical plane. The clearance 88 is minimal between the teeth of the vertical circular saw blade 16 and the underside of the substantially horizontal circular saw blade 18. The angular drive 84 extends a relatively short distance into the interior of the container 35 through an appropriate opening 113 in the plate 112 flanged onto the container wall 12, 13. An outlet passage 85 and, if necessary a conveyer belt 17, or the like, is contiguous to the window 15.

If the storage container 35 is charged with a mass of produce such as cereal or leaf crop by a loading wagon, or in any other manner, and the turntable is rotated in the direction U by switching on its drive mechanism, the mass of produce located on the turntable 5 serving as a rotating bearing surface is carried along the stationary container walls 12.

When the mass brushes against the horizontally operating circular saw blade 18 a substantially horizontal cut is made in the edge of the mass. In the embodiment illustrated, this cut is at substantially the same height as the upper edge of the window 15 and the upper edge of the vertically cutting saw blade 16 to which the outer layer of the mass sliding along the wall 12 of the container 35 is fed. The saw blade 16 thereby cuts vertically into the edge of the heap and pares a sliver therefrom which passes between the saw blade 16 and the oppositely disposed vertical edge of the window 15, i.e. outwardly through the window 15, substantially tangentially to the container 35, and through the passage 85 on to the conveyer belt 17. Preferably, the speed of the conveyer belt 17 is selected to be somewhat greater than the peripheral speed of the outer rim of the turntable 5, but is not so great as to break the sliver.

In addition to structural advantages with regard to cost and space, the combined drive of the two cutters 16, 18 from the same angular drive 84 is advantageous in that, on the one hand, the cutter 18 may be arranged at right angles to the vertical cutter 16 and, on the other hand, somewhat inclined towards the interior of the container and towards the turntable 5 relative to the horizontal. This inclination prevents a wedge of uncut produce forming (as a consequence of the circular shape of the cutters 16, 18 which must never quite touch each other) in the region 88 where the cutters 16, 18 almost touch each other; otherwise, separate stalks between the two cutters might arrive uncut at the outlet passage 85 where they could cause blockages. However, if the "horizontal" cutter is inclined inwards slightly, the height of the sliver passing outwardly through the window 15 is lower than the the upper edge of the vertical saw blade 16. Thus, the complete severing of the outgoing sliver is ensured, even if the vertical and horizontal cutters 16, 18 do not touch each other.

Further, this construction enables the diameter and shape of the horizontal and vertical cutters 16, 18 to be varied. For example, according to FIGS. 1, 2, 4, 5 it is possible for the horizontal cutter 18 (whose axis of rotation is located outside the outlet passage 85) to have a greater diameter than the vertical cutter 16. In order to obtain the same peripheral speed and a substantially equal cutting performance, it is advantageous for the smaller cutter 16 to be driven at a corresponding greater speed.

Cutting chains (as in motor saws), cutter bars (as in mowing machines) cutting bands (as in band saws), or other cutting devices could be used instead of the circular saw blades or cutting discs 16, 18.

In accordance with the invention, additional devices are provided which are either operable manually or which may operate by contact elements in order to improve the movement sequence and increase the operational reliability, wherein it must be taken into account that reliable operation has to be ensured in the case of irregular loading and for different kinds of produce. These will be hereinafter described.

In the embodiment of FIGS. 1 to 6 a pusher flap 61 has proved itself to be particularly useful for effecting radial, outward displacement of the mass of produce rotating between the column 59 and the container wall 12, 13. Such pusher flap, by virtue of its appropriate crescent-like shape, lies closely against the outer sursurface of the column 59 in a space-saving manner and may be pivoted outwardly on a hinge 62 by a connecting rod 63 attached to a bracket 97. For moving the flap into a position 61a, 97a, 63a illustrated by broken lines, a crank 64 is pivoted to the connecting rod 63 and is secured to the shaft of a ratchet wheel 65.

If, for obtaining a greater capacity, the diameter of the column 59 is selected to be small relative to the diameter of the container 35, preferably ¼ to ⅙, it is recommended that the free end of the pusher flap 61 be provided with another outer pusher flap 161 on an appropriate hinge 162, a bracket 197 of which pusher flap 161 is connected to a connecting rod 163 pivoted to the column 59 at 117.

Figure 6:
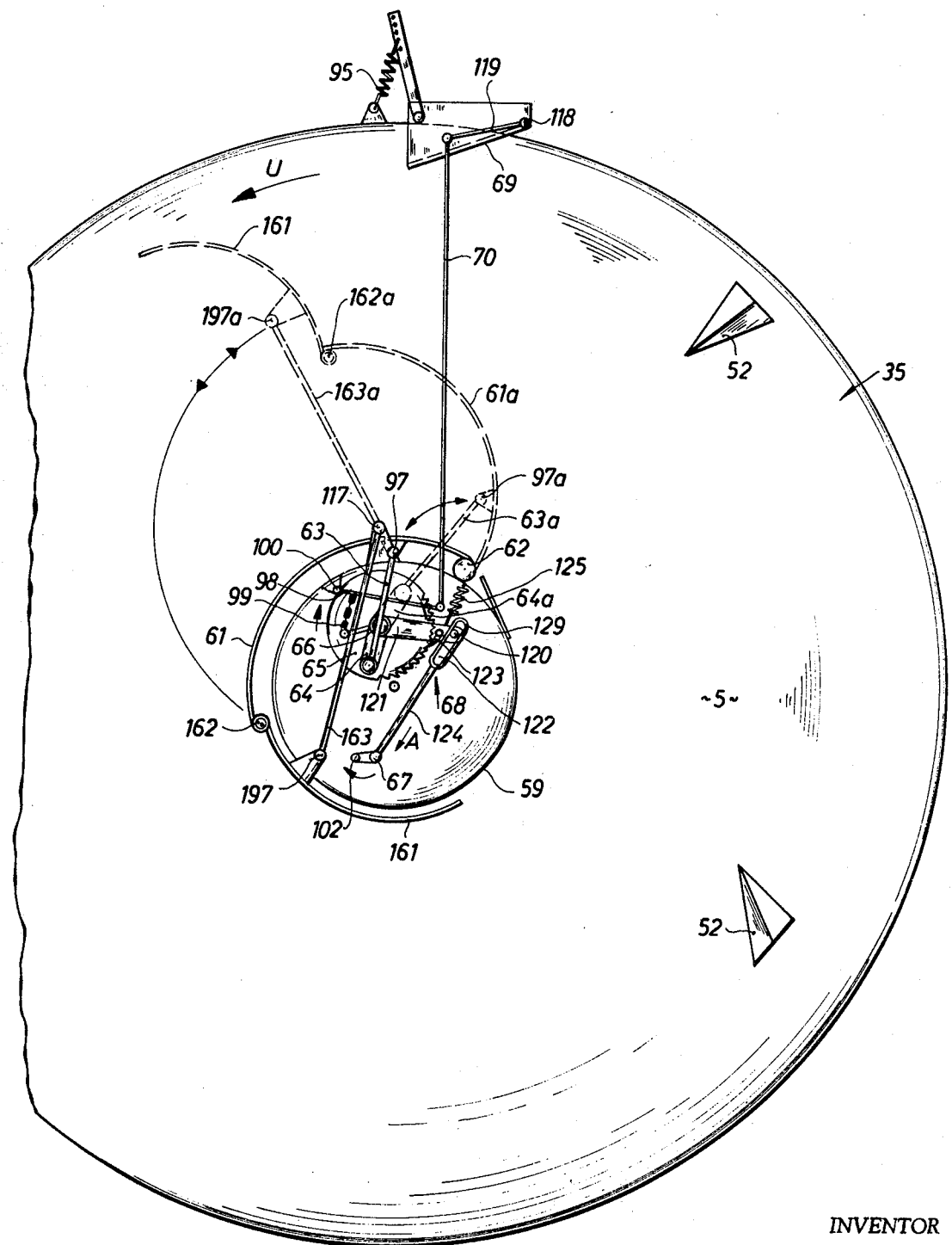
FIG. 6 is a detail plan view of a radial feed device of the embodiment of FIG. 1.

In the outer position illustrated in broken lines in the upper part of FIG. 6, the outer pusher flap is designated 161a, the bracket is designated 197a, and the connecting rod is designated 163a. Since the movement of the pusher flap 161 is positively coupled to that of the pusher flap 61, the pusher flap 161 is automatically displaced outwardly with the pusher flap 61 as soon as the ratchet wheel is stepped.

Figure 3:
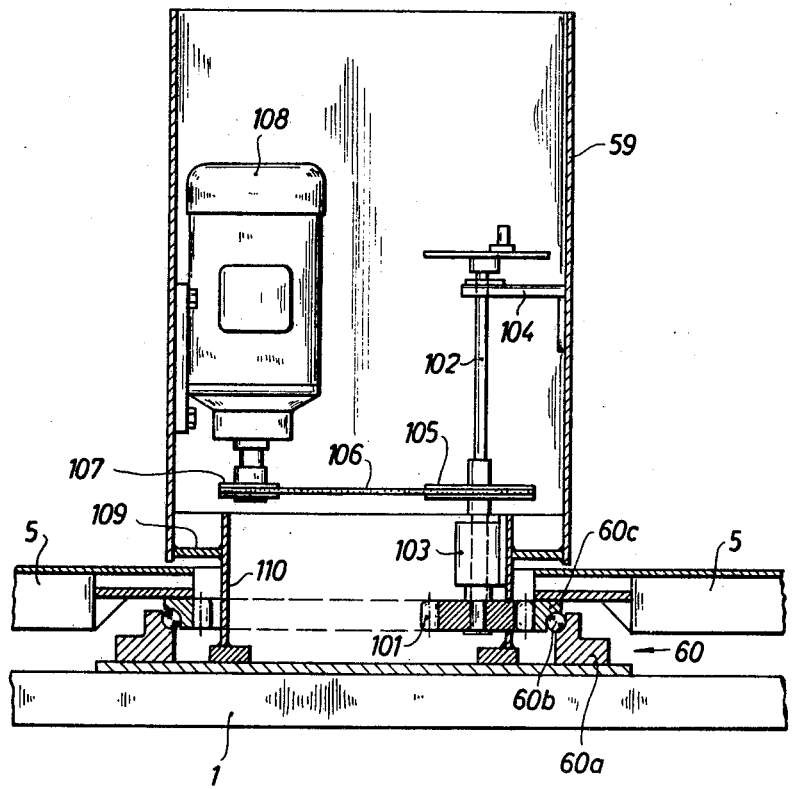
FIG. 3 is a detail elevation in section of a driving mechanism of the embodiment of FIG. 1.
Figure 4:
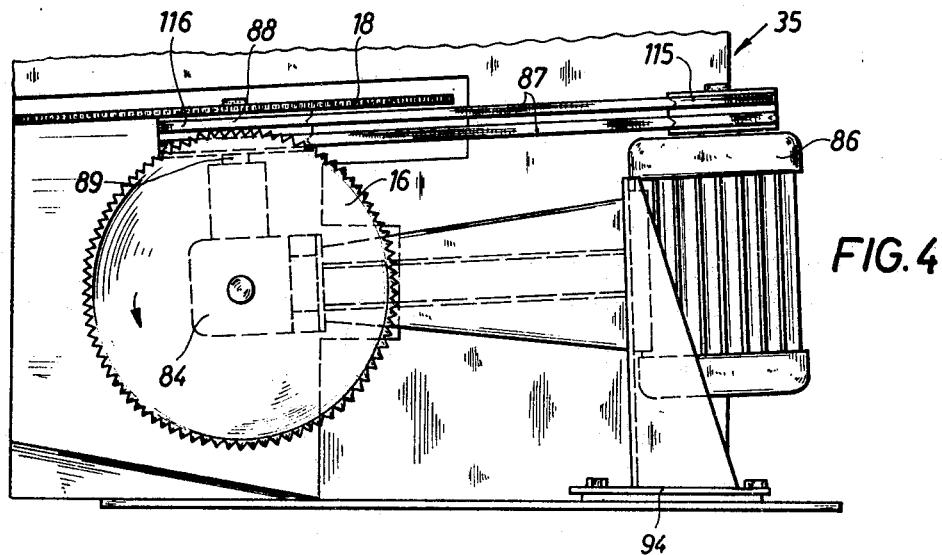
FIG. 4 is a detail end view of the cutting means of the embodiment of FIG. 1.
Figure 5:
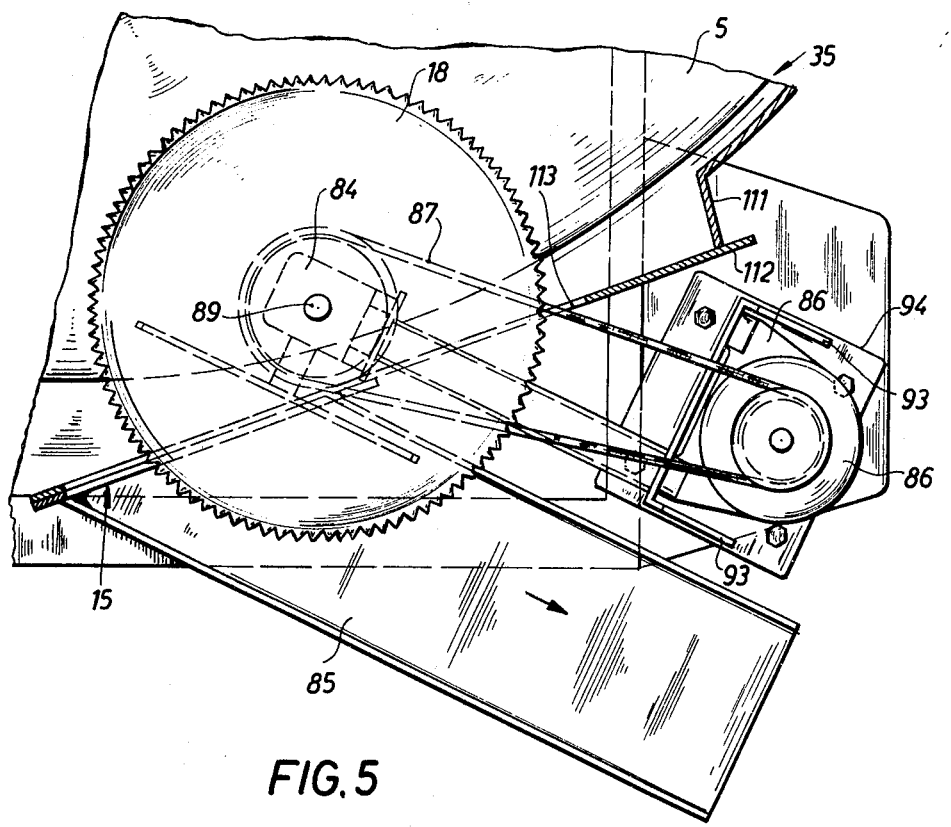
FIG. 5 is a detail plan view of the cutting means.

When the pusher flap 61 is pivoted outwardly, slowly or rapidly, manually or mechanically, after the container 35 is filled, its portion 161 located furthest from the centre of the turntable 5 presses against the mass located on the annular supporting surface and pushes it under simultaneous deformation thereof against the container wall 12, 13 and towards the outer rim of the turntable 5, and the free inner space of the produce which forms an annular enclosure continuously increases. In this simple manner the produce may be uniformly fed, and the container 35 completely emptied. A control mechanism 68 illustrated in FIG. 6 is provided for stepping the ratchet wheel 65 and is driven by a crank 67 secured to the shaft 102 (FIGS. 3 and 6). The control mechanism 68 has a connecting rod 124 pivoted to the crank 67, and having a longitudinal slot 122 embracing a pin 120 secured to the free end of a lever 121. The lever 121 is freely rotatable on the shaft 66 of the ratchet wheel 65 and carries a pawl 123 engaging in the teeth of the ratchet wheel 65 so that the pawl can drive the ratchet wheel only in a clockwise direction as seen in FIG. 6.

When the pin 120 is at the end 129 of the longitudinal slot 122, and the connecting rod 124 is moved in the direction designated by the arrow A by the crank 67, the pin 120 is carried along from the commencement to the end of the stroke. The pawl 123 thus imparts a maximum stepping movement to the ratchet wheel 65.

A medium stepping movement takes place if the pin 120 is in a central position in the slot 122 and consequently carried along by the slot end 129 at a later time. No shift takes place if the driver pin is at the opposite end of the slot at the commencement of the stroke, and the connecting rod 124 carries out an idle stroke and the ratchet wheel remains stationary.

The lever 121 has two arms, one of which arms is connected to a shift lever 98 by a longitudinally adjustable chain 99, the other arm being connected to a fixed point on the column 59 by a tension spring 125. Thus, the tension spring 125 holds the chain 99 permanently taut. The lever 98 is connected to a lever 119 via a rod 70, and the lever 119 is rigidly connected to a control flap 69 via a shaft 118 pivotably mounted on the container wall 12. A spring 95 engages on an outer arm of the control flap 69.

When the turntable rotates with a mass of produce thereon, the periphery of the mass in the vicinity of the container wall 12, 13 can exert sufficiently great pressure against the control flap that the latter pivots outwardly against the spring 95 and abuts against the container wall 113. In this case there is no lack of material at the container wall 12, 13 and at the cutters 16, 18, so that there is no need for the pusher flap 61 to pivot outwards. Consequently, the length of the chain is advantageously adjusted, so that when the control flap 69 is in abutment against the container wall 12, 13 the pin 120 of the lever 121, against the action of the spring 125, is at the end of the longitudinal slot 122 nearer to the crank 67, and the control mechanism is inoperative.

Automatic operation can be started any time desired in that, for example, the effective length of the chain 99 can be varied by selecting an appropriate link to connect with lever 98 and/or one arm of lever 121.

If, in special cases, e.g. with particularly bulky produce such as maize, brushwood or refuse, very great forces were necessary for the outward movement of the pusher flap 61, it may be advantageous to arrange the cutting mechanism 16, 18 on a sliding carriage displaceable from the outside to the centre point of the turntable 5 and/or adjustable to a greater height. If required, the sliding carriage can be equipped with drive elements such as electric motors, flexible leads or hydraulic or pneumatic devices, in addition to the cutting elements, so that orderly operation is possible in all operating positions. In particular, the cutters can be kept in contact (by using feed rollers if necessary) with the outer layer of the mass as it becomes smaller or lower, and to pare off a sliver having a cross section of the greatest possible uniformity, so that the sliver may pass to the outlet passage or conveyor belt 17 in a troublefree manner. On the one hand, in the inner position of the sliding carriage, the connection with the conveyor belt 17 should be maintained and, on the other hand, in the outer position, the sliding carriage must not strike against any following machine contiguous to the conveyor belt 17. Differences in height may be compensated for by hinge-like connections, particularly to and at the outlet passage 85.

A hinge-like connection to the outlet passage 85 to the conveyor belt 17 is desirable even if, instead of or in addition to the cutters 16, 18, a cutter arrangement is used which acts on the edge of the mass of produce from above and there pares off an upper sliver of produce. For this purpose, it is advantageous to provide a cutter and sliding carriage which is adjustable in height under the control of sensing elements, particularly contact and pressure rollers (such as 40 in FIG. 7), which sense the upper edge of the mass and, preferably by weight-relief suspension, take into account surface irregularities which may, of course, be extensively compensated for by pressure rollers connected in front of the cutters and running on the edge of the mass.

The arrangement of a cutter acting on the top of the mass, or a plurality of cutters one above the other, is particularly recommended in the case of a high stack of heavy and long-stalked produce which is so compact that the pusher flap 61 meets with difficulty during its outward movement.

If the cutter is arranged to be adjustable in height, and a sliver is pared off commencing at the outer upper layer of the mass, the further breaking up of the mass takes place in the form of flat convolutions, as soon as the cutter has, in this manner, cut free an outer annular surface extending over the entire height of the container, when the sliding carriage moves downwards, the control flap 69, and the adjusting device for the pusher flap 61 controlled thereby, come into action, so that the produce extending over the entire height of the container may now be pushed outwards to the width of the sliver, i.e. the annular surface vacated by the sliver. In the meantime, the vertical sliding carriage with the cutter is moved upwards under control of the sensing roller, the rolling of the sensing roller on the steep outer edge of the mass being facilitated by ribs or spikes on the periphery of the sensing roller. Electric or hydraulic motors, or drive shafts or the like driven by a tractor, may be considered as the means of driving the entire apparatus.

Figure 7:
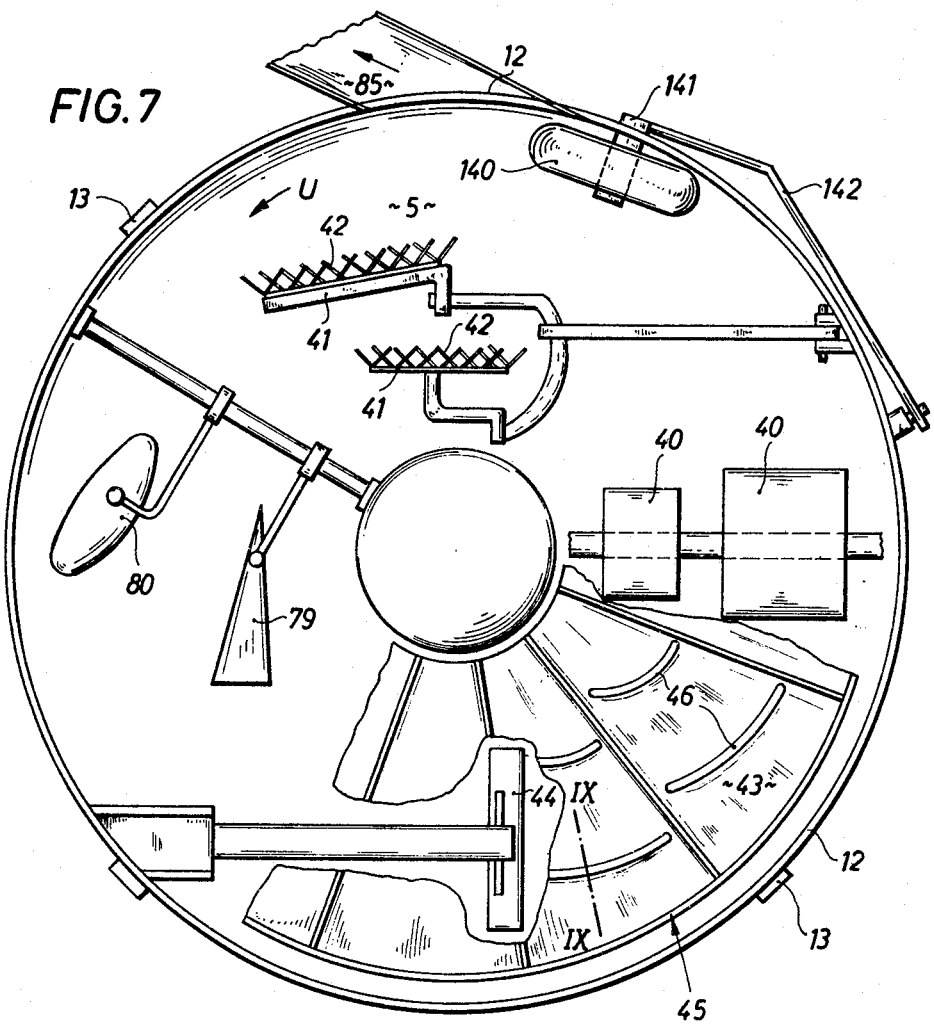
FIG. 7 is a detail plan view of another embodiment.
Figure 8:
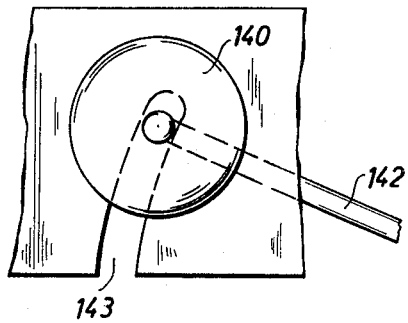
FIG. 8 is a detail elevation of part of the embodiment of FIG. 7.
Figure 9:
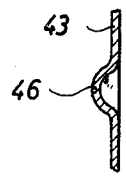
FIG. 9 is a detail section taken on the line IX—IX of FIG. 7.

Insofar as they are to assist the movement of the mass of produce rotating on the turntable 5 to the cutters 16, 18, the means hitherto described may be partly replaced and partly supplemented by one or more of the several means illustrated in FIG. 7.

Basically, these means are arranged rigidly or movably, single or multiple, swingingly, rotatably or adjustable in height, on the stationary part of the device. In general, they act on the upper end or on another outer surface of the rotating mass, and come into effect by deceleration, separation, shearing or deflection.

One form of means comprises one or more pressure roller. Two such pressure rollers are designated 40. Advantageously they are of such a weight and width that, on the one hand, they can compress loose produce downwards and, on the other hand, they may be arranged in oblique positions so that they promote outward sliding of the produce on the turntable 5.

Particularly when they are arranged in front of the cutters 16, 18, pressurer rollers 40 of this kind effect a pre-pressing promoting the cutting and the conveying away of the sliver of the produce.

Another pressure roller illustrated in FIG. 7 is designated 140 and is mounted on a swinging arm 142 in front of the cutters, the bearing pin 141 of which pressure roller is guided from the outside through an arcuate slot 143 in the container wall 12.

Another form of means comprises swingingly suspended star wheels 41, particularly when they have backwardly bent prongs, effect a loosening of the surface of the mass and a relatively pressure less lateral conveyance of the loosened batches towards the container wall. In the case of particularly delicate produce, vegetables for example, spring relieved suspension is preferred for the star wheel 41.

A further form of means comprises presser plates 43 and drag beams 44, and presser rings 45 substantially filling the cross section of the container, and which may be assembled from segments, are useful means for assisting the outward radial movement of the mass towards the cutters. This is particularly effective if these elements are arranged somewhat laterally, or if they have flexures or curved ribs 46 which act on the mass of produce to promote an outward radial movement.

A still further form of means illustrated in FIG. 7 comprises appropriately set oblique cutter plates 79 which act like known plough-shares, and/or cutter discs 80 which, by cutting into and pressing out the surface parts of the mass, assist in pushing the surfaces parts outwards.

Figure 10:
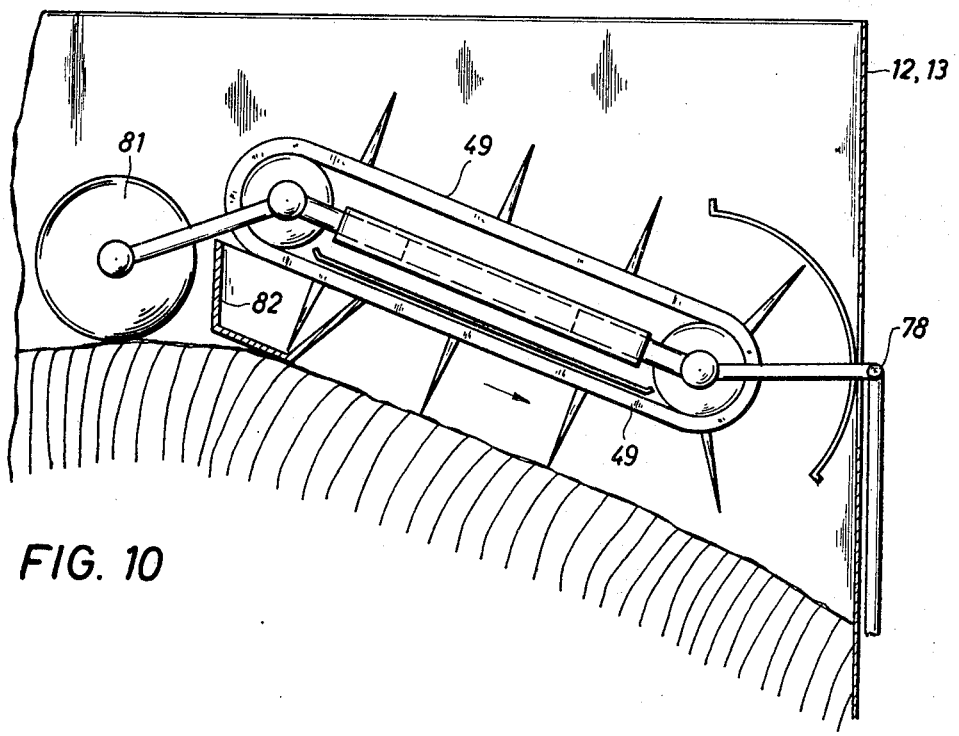
FIG. 10 is a detail section of another embodiment.

Another form of means is illustrated in FIG. 10 and comprises driven conveyor elements 49 in the form of a conveyor chain having appropriate prongs. The conveyor unit, driven by an electric motor for example, is swingingly suspended on the outer wall 12, 13 of the container at 78 and, by means of feeler rollers 81 and feeler plates 82 arranged on its frame, abuts against the surface of the mass. The conveyor chain 49 transports the rotating mass of produce outwardly towards the container wall into the space left free by the downward sliding movement to the operating position of the cutters 16, 18. The conveyor unit could also be arranged on the container wall, and be displaceable with respect to height, and screw conveyors, push rods or other known conveyor means may be used instead of conveyor chains.

Figure 11:
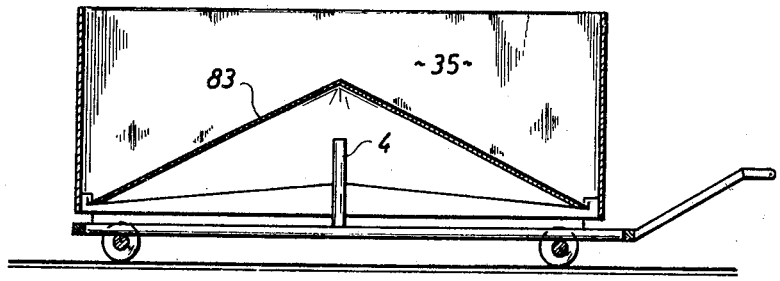
FIG. 11 is a diagrammatic section of another embodiment.

FIG. 11 illustrates a storage container 35 (without a column 59 containing the drive) having a drive shaft 4 of conventional kind, in which the base of the turntable is constructed as a relatively steep conical surface 83 in order to allow the produce to slide radially outwards towards the cutting means (not illustrated).

Figure 12:
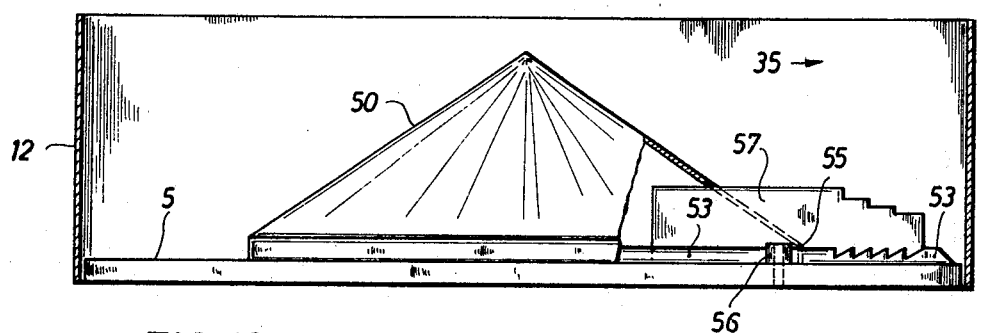
FIG. 12 is a detail partly in section of another embodiment.
Figure 13:
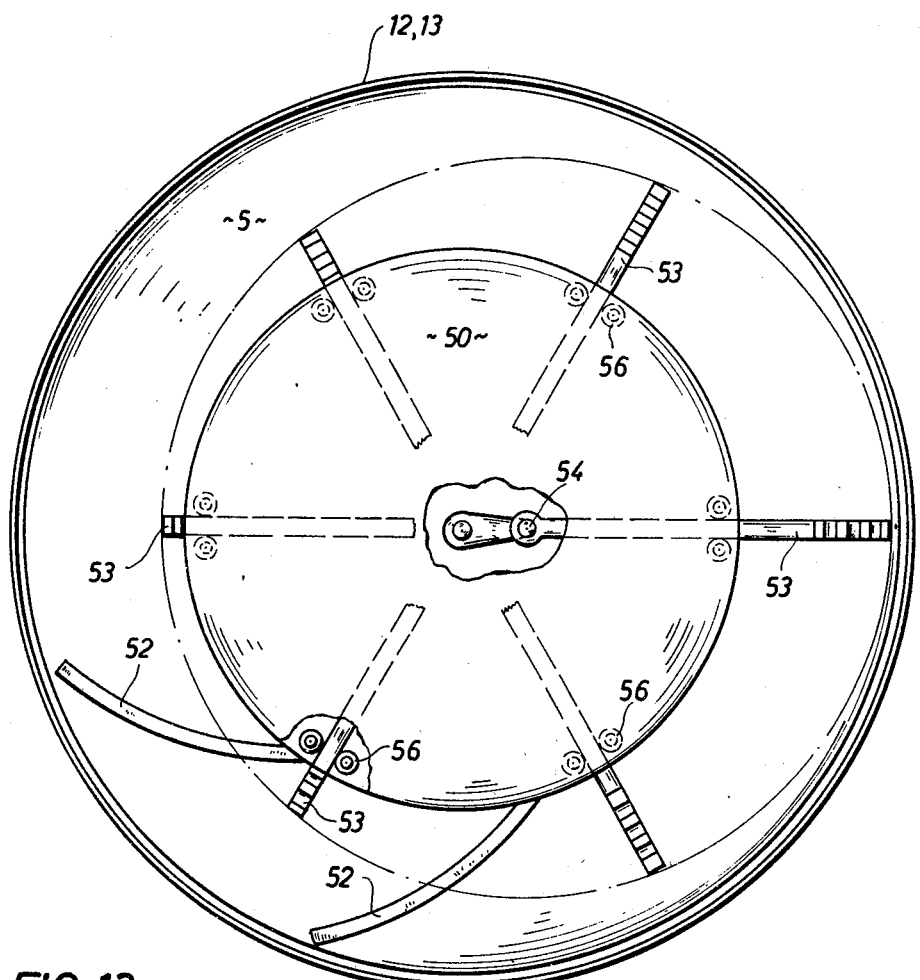
FIG. 13 is a plan view of the embodiment of FIG. 12.

FIGS. 12 and 13 illustrate an embodiment in which the turntable 5 has a conical centre portion 50, pushers 53 between pairs of rollers 56 being guided in corresponding radial openings 55 in the flat annular outer portion of the turntable 5. Since the pushers are connected at one end to a fixed eccentric pin 54 and pivoted about the pin 54 by the turntable when they are taken along, each of the pushers 53 are moved outwards and inwards once during each rotation. During the outward movement, the end faces and saw-tooth-shaped prongs of the pushers 53 carry the produce at the height of the turntable outwards and thereby assists the action proceeding from the cone 50 in the same direction. The action of the pushers 53 may be improved by segmental plates 57 having a large engaging surface in the conveying direction for picking up the produce. The segments 57 may be made in one piece with the pushers 53 and slide fully into the interior of the cone 50 during the return stroke. Curved ribs 52 are provided on the turntable 5 and may impart a certain outward movement to the mass as soon as slip is obtained between the mass and the turntable by other means already described.

The ribs 46 in FIG. 14 act in the same manner where the column 59 equipped with a pivotable pusher flap 61 is arranged on an elevated centre portion of the turntable 5 in the shape of a rising spiral.

A spatial spiral 51 of this kind is illustrated in FIGS. 15 and 16 and extends across almost the entire surface of the turntable 5. In this embodiment, since there is no column 59 with the pusher flap 61, the mass of produce is pushed outwards towards the cutting means by the relative movement of the mass (to be somewhat decelerated, if necessary) and the somewhat more rapidly rotating turntable 5. This simple construction is adequate for produce which is not greatly interlaced.

For the rest, FIGS. 17 and 18 illustrate guide ribs 73 arranged on the container wall 12, 13 and directed downwards to the cutting means in the direction of movement.

In FIG. 19 a barb 74 is illustrated which is pivotable about a pivotal point 126 outside the container wall 12, 13, and whose hooked portion may be pivoted into the interior of the container through the wall 12, 13. This enables the hook to be plunged into the mass of produce occasionally and thus temporarily decelerate the outer layer thereof. Since the entire mass remains in rotation during this operation, these kinds of barbs 74 have a braking effect which draws the mass of produce towards the wall. In order to obviate excessive pressure on the container wall 12, 13, the barb 74 must be withdrawn after a short time so that the outwardly drawn portions may continue to rotate at the speed of the turntable 5.

Conveyor elements 127, which engage through wall openings into the interior of the container in FIG. 19, rotate in the opposite direction to the turntable 5 and therefore have a more uniform and more easily controllable braking effect than the barbs 74.

Any number of the above-mentioned elements may be arranged one behind the other, staggered or in echelon, so that, in addition to its own strip, the following element may grasp and convey the material taken off by the element moving ahead of it.

Figure 20:
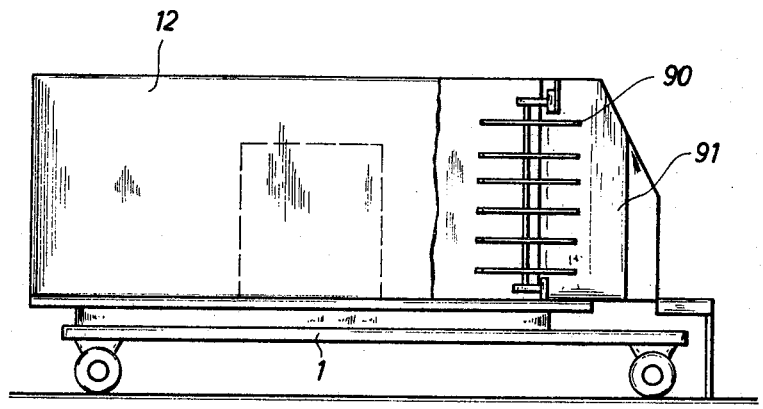
FIG. 20 is a partial side elevation of another embodiment.
Figure 21:
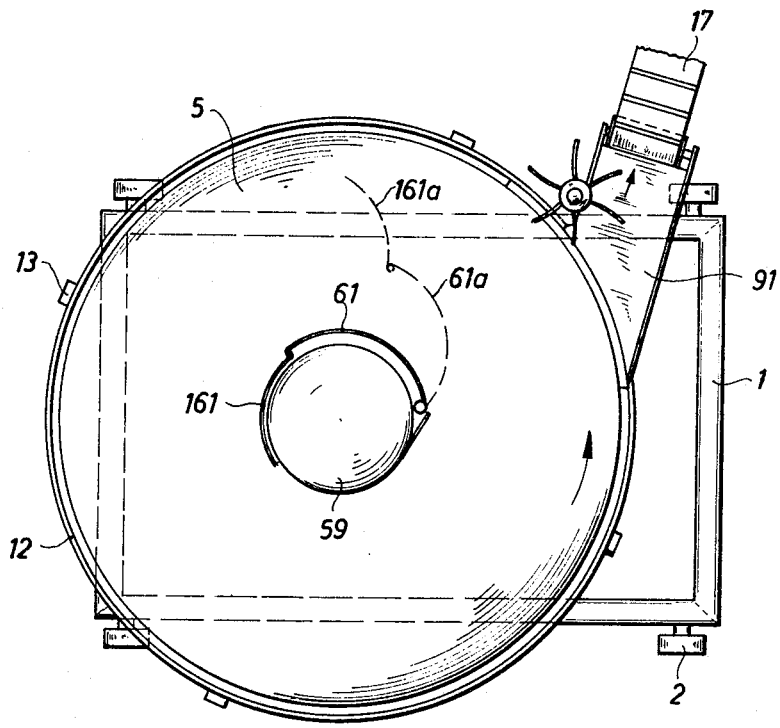
FIG. 21 is a partial plan view of the embodiment of FIG. 20.

An embodiment is illustrated in FIG. 20 in which cutter or beater rollers 90 rotate, in front of an outlet opening, on a preferably vertical shaft whose height is substantially the same as the height of the container. Thus, the entire height of the edge of the mass of produce is beaten off or cut off. The separate parts are thrown outwards through a protective cover serving as an outlet opening 91 where they fall on to a belt 17 or into the receiving container of a following machine. The fragmentation of the commodity is fine or coarse according to the speed setting of the mechanism inside the container for moving, for example, the pusher flap 61 pushing the heap of fodder circularly outwards. This embodiment operates in an extremely reliable manner and, compared with known machines, requires a low expenditure on labour and material.

In addition to this, the cylindrical shape of the discharge container is especially advantageous for use as a stationary fodder centre for incorporation in buildings. The round shape admits of the arrangement of any number of inlet and outlet openings at any peripheral position. For example, conveyor belts for charging rubbish spaces, pneumatic conveyors for filling silos, conveyor belts or chain conveyors for loading fodder tables or mangers, or conveyer devices for transporting straw for the animal stalls, may be connected at different radial directions.

Whilst the assembly and dismantling of these bulky conveyer devices for indoor work was previously extremely space-wasting and complicated (e.g. in the case of pneumatic conveying pipes), here the possibility exists of arranging the outer walls 12, 13 of the container 35, or the frame 1, to be rotatably adjustable. This enables the position of the inlet or outlet opening to be varied in the peripheral direction, when demand arises.

The container 35 may also be constructed so that the filling opening remains in the same position, the cutters 16, 18 with the window 15 being pivotable so as to extend in different directions relatively to the centre axis of the container.

The swivel-feature of the cutters 16, 18 does not even require the outlet passage 85 to be pivoted along with it. It is frequently more advantageous to provide a plurality of closable outlet openings 15 and selectively open the one leading to the desired following machine. Thus, the container 35 represents a stationary centre from which material may be transferred to various conveyers and following machines after the shortest change-over period and without the complicated dismantling or shifting of conveyer devices. Thus, it is also possible, for example, to carry out the daily feeding operations mechanically without any appreciable setting-up time, even if, between feeding times, the container has to be temporarily filled with material for further transportation to rubbish spaces or silos.

I claim:

1. In apparatus for breaking up a heap or mass of cereal or leaf crop, comprising a storage container adapted to receive a heap or mass of leaf crop and having a turntable adapted to be rotated about a vertical axis and a stationary wall substantially symmetrical about the rotational axis of the turntable and provided with an outlet aperture, sawing or cutting means having movable elements extending into the interior of the container whereby to engage with a heap or mass therewithin to pare a continuous skein from the outer layer thereof, said outlet aperture allowing the skein to pass from the interior of the container to the outside; that improvement which comprises means on a stationary part of said container for engaging directly on the rotating heap or mass for urging the heap or mass outwards into the region of said sawing or cutting means.

2. Apparatus according to claim 1, in which said container has a central column and said means for urging the heap or mass outwardly comprises an outwardly directable deflector secured to the outer surface of said central column above the turntable.

3. Apparatus according to claim 2, in which said deflector comprises an adjustable pusher flap mounted for pivotal movement about a vertical axis into an operative position and into an inoperative position, said deflector when in its inoperative position lying closely against the central column.

4. Apparatus according to claim 3, in which said central column is constructed as a hollow cylinder passing through a central opening in the turntable and drive means for displacing said pusher flap outwardly in a direction from its inoperative position towards its operative position are located in the said hollow cylinder.

5. Apparatus according to claim 4, in which the shape of said pusher flap is adapted to the outer surface of the hollow cylinder, and said pusher flap comprises at least two curved portions connected together by a hinge, the aggregate peripheral length of the curved portions being greater than half the periphery of the hollow cylinder.

6. Apparatus according to claim 3, in which said pusher flap is arranged behind the window in the container wall as seen in the direction of rotation of the turntable.

7. Apparatus according to claim 4, in which said drive means for displacing said pusher flap outwardly is controllable by a further drive means equipped with an adjustable feed.

8. Apparatus according to claim 7, in which a feeler element is arranged in the radial plane of the pusher flap and is adapted to automatically cut out outward movement of the pusher flap in dependence upon a maximum pressure produced by the rotating mass.

9. Apparatus according to claim 8, in which the feeler element is a control flap pivotably arranged on the container wall.

10. Apparatus according to claim 4, in which said drive means for the pusher flap is a controllable step-by-step mechanism.

11. Apparatus according to claim 2, in which drive means for the turntable is accommodated in said hollow central column.

12. Apparatus according to claim 11, in which said turntable is provided with an internally toothed ring gear with which meshes a gear wheel drivable by an electric motor disposed in the central column.

13. Apparatus according to claim 1, in which said means for urging the heap or mass outwardly comprises movable elements connected to the turntable and engaged with an eccentric on the stationary part of the container such that the elements are displaceable outwardly above the surface of the turntable.

14. Apparatus according to claim 13, in which the movable elements comprise a plurality of feed elements radially displaceable above the turntable and uniformly distributed around the periphery of the turntable.

15. Apparatus according to claim 14, in which said feed elements are arranged at least partially below a conical central part of the turntable.

16. Apparatus according to claim 1, in which said means for urging the heap or mass outwardly comprises fixed deflector surfaces directed towards the window and arranged on the inside of the container wall.

17. Apparatus according to claim 1, in which said means for urging the heap or mass outwardly comprises pivot arms pivotally connected to the container wall and carrying at their free ends pressure means adapted to be applied to a rotating heap or mass on the turntable to urge it to move outwards or downwards.

18. Apparatus according to claim 1, in which said means for urging the heap or mass outwardly comprises segmental plates adapted to engage the top surface of a rotating heap and exert a pressing action on the heap by their own weight, the plates including curved deflectors projecting from their undersides for urging the heap or mass outwardly.

19. Apparatus according to claim 1, in which said means for urging the heap or mass outwardly comprises conveyer means and drive means therefor carried by at least one pivot lever pivotally attached to the container wall such that said conveyor means can engage the upper surface of a rotating heap or mass and impart to it a radially, outwardly directed feed movement.

20. Apparatus according to claim 19, in which feeler rollers and/or feeler plates acting as skids are arranged at or near the end of said conveyor means and sense or bridge-over irregularities on the surface of the heap or mass.

21. Apparatus according to claim 1, including braking elements actuable from outside the container for periodically attempting to arrest and then release the rotating heap or mass.

22. Apparatus according to claim 21, in which said braking elements are constructed as pivotable barbs mounted on the container wall and each having an angled arm periodically movable inwardly and outwardly through an aperture in the container wall.

23. Apparatus according to claim 22, in which said angled arm is retained in an operative position by spring means and yields when the pre-tension of the spring is exceeded, and is subsequently snapped back into its operating position.

24. Apparatus as claimed in claim 1, including movable conveyer elements mounted on the container wall and engageable through the container wall with an outer layer of the heap or mass for accelerating or retarding the heap or mass in the peripheral direction.

25. Apparatus according to claim 1, in which said sawing or cutting means is adjustable in height and secured to the stationary part of the container.

26. Apparatus according to claim 1, in which said sawing or cutting means is movably arranged on the stationary part of the container so that its distance from the centre of the turntable is adjustable.

27. Apparatus according to claim 26, in which the distance of the sawing or cutting means from the centre of the turntable is automatically controllable in response to a feeler element sensing the heap or mass.

28. Apparatus according to claim 1, in which the sawing or cutting means comprises two rotatable saw blades whose axes are disposed at right angles to each other and which are drivable by a common angular drive.

29. Apparatus according to claim 1, in which said sawing or cutting means comprises at least one cutting or beating roller rotatable about a vertical axis.

30. Apparatus according to claim 29, in which said cutting or beating roller extends across the entire height of the heap or mass or of the container.

31. In apparatus for breaking up a heap or mass of cereal or leaf crop, comprising a storage container adapted to receive a heap or mass of cereal or leaf crop and having a turntable adapted to be rotated about a vertical axis and a stationary wall substantially symmetrical about the rotational axis of the turntable and provided with a window aperture, sawing or cutting means having movable elements extending into the interior of the container whereby to engage with a heap or mass therewithin to pare a continuous sliver from the outer layer thereof, said window determining the cross section of the sliver and allowing the sliver to pass from the interior of the container to the outside; that improvement which comprises means on a stationary part of said container for engaging directly on the rotating heap or mass for urging the heap or mass outwards into the region of said sawing or cutting means.

References Cited

UNITED STATES PATENTS

| | | | |
|---|---|---|---|
| 2,615,594 | 10/1952 | Clapp | 222—80 |
| 3,314,461 | 4/1967 | Larsson | 146—105 |

FOREIGN PATENTS

| | | |
|---|---|---|
| 833,320 | 3/1952 | Germany. |
| 405,002 | 7/1966 | Switzerland. |

W. GRAYDON ABERCROMBIE, Primary Examiner

U.S. Cl. X.R.

146—125, 167